United States Patent [19]

Reynolds

[11] Patent Number: 4,949,589
[45] Date of Patent: Aug. 21, 1990

[54] TRANSMISSION MAINSHAFT GEAR RETAINER

[75] Inventor: Joseph E. Reynolds, Climax, Mich.

[73] Assignee: Eaton Corporation, Cleveland, Ohio

[21] Appl. No.: 329,134

[22] Filed: Mar. 27, 1989

[51] Int. Cl.$^5$ .............................................. F16H 3/08
[52] U.S. Cl. ...................................... 74/363; 74/333
[58] Field of Search ............... 74/357, 359, 363, 374, 74/375; 192/48.91, 48.9, 48.8

[56] References Cited

U.S. PATENT DOCUMENTS 3,425,290  2/1969  Perkins .................................. 74/331
4,104,928  8/1978  Vandervoort .................... 74/359 X

FOREIGN PATENT DOCUMENTS 0090531 10/1983 European Pat. Off. .............. 74/374
1942179  3/1981 Fed. Rep. of Germany ........ 74/363

Primary Examiner—Leslie A. Braun
Assistant Examiner—Khoi Q. Ta
Attorney, Agent, or Firm—A. E. Chrow

[57] ABSTRACT

A twin countershaft transmission (100) is provided having axially adjacent floating mainshaft gears such as referenced by numerals (30) and (32) whose axial thrust when engaged is transmitted to the mainshaft (48) rather than to the adjacent gear by means of gears (30) and (32) having respective flanges (42) and (44) that extend radially inwardly between their axially spaced-apart thrust washers (46, 50, 52) splined to mainshaft (48).

7 Claims, 2 Drawing Sheets

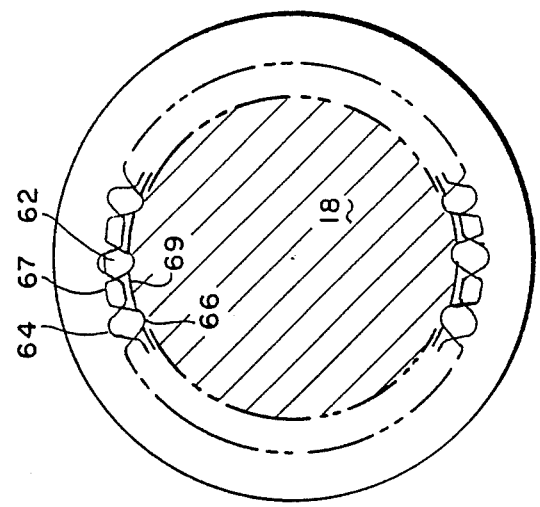
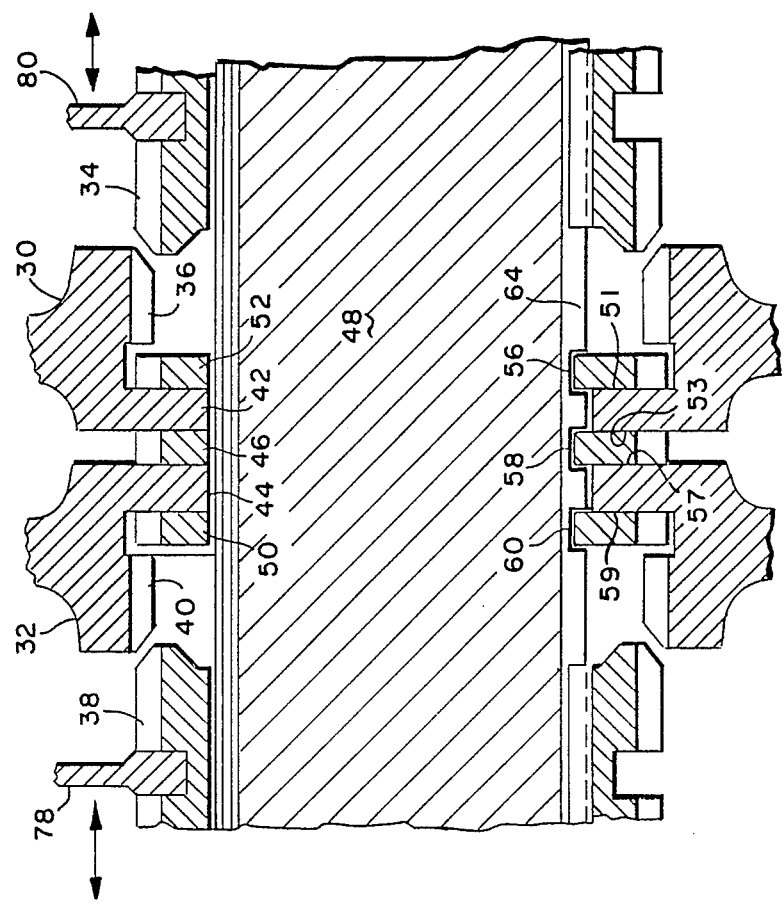

TRANSMISSION MAINSHAFT GEAR RETAINER

INTRODUCTION

This invention relates generally to an improved gear retainer thrust means for transferring axial thrust of a floating mainshaft gear being clutched to a transmission mainshaft rather than to an adjacent mainshaft gear and more particularly to such thrust means comprising a combination of components that are simple in design and economical to manufacture and assemble in addition to enabling axial thrust to be transmitted to the mainshaft without relative rotation between the mainshaft gear and the particular component transmitting axial thrust therefrom to the mainshaft.

BACKGROUND OF THE INVENTION

Transmissions featuring floating transmission mainshaft gears such as associated with twin countershaft transmissions are well know and examples of which can be found in U.S. Pat. Nos. 3,237,472; 3,238,613; 3,425,290; and 3,885,446, the disclosures of which are incorporated herein by reference.

Such transmissions generally feature a plurality of floating mainshaft gears that encircle the mainshaft and are supported and driven by countershaft gears, typically two countershaft gears, that are mounted on a pair of countershafts disposed on opposite sides of the mainshaft.

The mainshaft gears are characteristically clutched to the mainshaft by means of a clutch mechanism that slides along external splines extending axially along the mainshaft and has radially inwardly extending teeth or splines that engage internal teeth or splines on the mainshaft gear so as to cause rotation of the mainshaft when the mainshaft gear is clutched thereto.

A problem long ago recognized has been the potential transfer of axial thrust to a mainshaft gear being clutched due to their characteristic close proximity to each other. In view of such, a variety of solutions have been devised over past years for the transmitting axial thrust imparted by an axially moving clutch to the mainshaft rather than to the gear adjacent the gear being clutched to the mainshaft.

Such solutions have generally been in the form of gear retainer(s) of one type or another that characteristically limit axial movement of the mainshaft gears to prevent them from engaging each other whether or not one of them is being clutched to the mainshaft.

One example of a retainer assembly for limiting axial movement of a transmission gear is disclosed in U.S. Pat. No. 2,397,905, the disclosure of which is incorporated herein by reference. Here however, a costly and expensive pivotal woodruff key is required to lock a thrust collar onto external splines of the mainshaft to prevent a gear from moving axially.

An example of a splined thrust washer for transmitting axial thrust from a gear set to a propeller drive shaft is disclosed in U.S. Pat. No. 3,894,621, the disclosure of which is incorporated herein by reference. Here, a splined thrust washer (52) is slid axially along the shaft splines to a transverse groove adjacent a stepped shoulder on the shaft and is held in place against the shoulder by a splined collar (30). Thrust washer (52) is operative to transmit axial thrust of only one gear to the propeller shaft and in addition to requiring the use of Collar (30), also requires costly and complex machining of a stepped configuration to the Propeller shaft exterior.

A more recent example of a transmission mainshaft gear retainer for preventing axial movement of two closely spaced gears to prevent transfer of axial thrust force therebetween is disclosed in U.S. Pat. No. 4,034,620, the disclosure of which is incorporated herein by reference. Here a thrust ring (104) is splined to the mainshaft between two adjacent gears and is held in place by means of snap rings (108, 110) on opposite sides thereof. The gears are further required to have costly and complex mating tongue and groove configurations that operate in conjunction with an additional snap ring (102) to limit movement of the gears away from each other.

In view of the above, a need exists to provide a simple and low cost means for transmitting axial thrust imparted by a clutch to a floating mainshaft gear being clutched to the mainshaft rather than to an adjoining gear by retaining means that can be easily assembled into the mainshaft and rotate in unison with the mainshaft gear being clutched.

SUMMARY OF THE INVENTION

Accordingly, it is an object of this invention to provide means to transmit axial thrust from a transmission mainshaft gear being clutched to the mainshaft.

It is another object of this invention to provide axial thrust means for directing axial thrust imparted to a transmission floating mainshaft gear by a clutch mechanism to the mainshaft rather than to an adjacent mainshaft gear in close proximity thereto.

It is still another object of this invention to provide a transmission having floating mainshaft gears with an improved means for transmitting to the mainshaft axial thrust imparted to a mainshaft gear being clutched to the mainshaft by a clutch mechanism rather than to an adjacent mainshaft gear.

It is yet another object of this invention to provide means for transmitting axial thrust of a transmission mainshaft gear to the mainshaft that is simple in design and economical to manufacture and assemble and rotates in unison with the mainshaft gear being clutched to the mainshaft.

BRIEF DESCRIPTION OF THE DRAWINGS

FIGS. 2A and 2B respectively show enlarged side and end views of the axial thrust means of transmission 100 of FIG. 1.

DESCRIPTION OF SOME PREFERRED EMBODIMENTS

Figure 1:
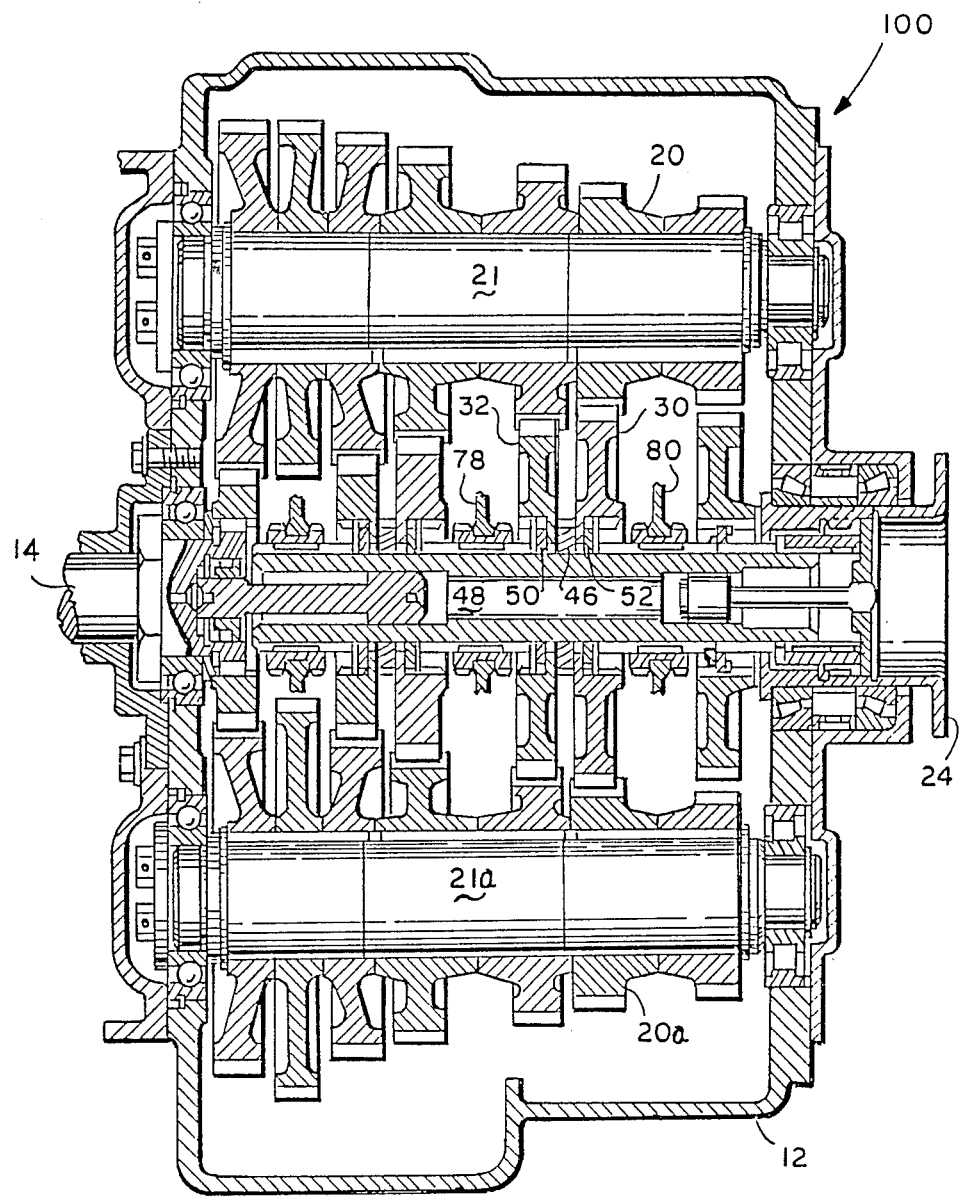
FIG. 1 is a central cross-sectional view of the twin countershaft transmission 100 utilizing axial thrust means according to the invention.

Transmission 100 is a twin countershaft type transmission similar to transmission 10 described in detail in U.S. Pat. Nos. 3,105,395 and 4,034,620, assigned to the assignee of the present invention, and whose operation and many of whose parts will not therefore be described herein in detail other than to the extent of the improvement imparted thereto by the axial thrust means of the invention hereinafter described in detail.

In FIG. 1, transmission 100 has an input shaft 14 that is rotated by an engine, commonly a vehicular internal combustion engine. Input shaft 14 in operative in turn carry countershaft gears such as 20 and 20a having external teeth that engage, support, and rotate floating mainshaft gears such as 30 and 32 that encircle mainshaft 48 and cause shaft 48 to rotate and rotate output shaft 24 when clutched to mainshaft 48 by axial slidable clutches such as 78 and 80.

As can be seen in FIG. 1, input shaft 14, twin countershafts 21 and 21a, mainshaft 48, and output shaft 24 are all journaled for rotation on housing 12.

It is readily apparent in FIG. 1 that floating mainshaft gears 30 and 32 are closely adjacent and might touch each other in response to axial movement of either one towards the other such as when axial thrust is imparted therefrom when being clutched to mainshaft 48 by clutches 78 and 80 as hereinafter described in more detail with respect to FIGS. 2A and 2B.

As shown in FIG. 2B, mainshaft 48 is provided with a plurality of substantially uniformly spaced splines that extend axially along the outer surface thereof and whose alternate grooves are referenced by numeral 66 and whose alternate teeth are referenced by numeral 67.

Floating mainshaft gear 30 has internal teeth 40 that are engaged by external teeth 38 of clutch 78 when clutch 78 is moved axially towards the viewer's right in FIG. 2A when clutch 78 is moved axially in response to a shift command to clutch gear 32 to mainshaft 48 so as to rotate shaft 48 and output shaft 24 at some predetermined speed.

Similarly, floating mainshaft gear 30 becomes coupled or clutched to mainshaft 48 when clutch 80 is moved axially towards the viewer's left in FIG. 2A to cause engagement between external teeth 34 of clutch 80 and internal teeth 36 of gear 30.

It can readily be seen that without some type of means for maintaining an axial-spaced relationship between gears 30 and 32 that they could touch each other and transmit undesirable axial thrust from one to the other imparted to the one being clutched to the mainshaft by the clutch mechanism.

The axial thrust means of the present invention shown in FIGS. 1A and 2B provides the means for transferring the axial thrust to the mainshaft rather than to the adjacent floating mainshaft gear which itself is being rotated by a countershaft gear.

In FIG. 2A, the axial thrust means is provided by gear 30 having a flange 42 that extends towards but does not touch external spline teeth 67 on shaft 48. Likewise, gear 32 is provided with a flange 44 that extends towards but does not touch external spline teeth 67 on shaft 48.

A first thrust washer 46 is disposed in an annular groove 58 in shaft 48 that cuts through and is substantially transverse to spline teeth 67.

Flanges 42 and 42 each have respective thrust surfaces 51, 53 and 57, 59 on opposite sides thereof that face away from each other in substantial parallel relationship with mainshaft 48.

Thrust surface 53 of flange 42 is operative to engage washer 46 when gear 30 is clutched to mainshaft 48 and reacts with the edge of groove 58 to transmit axial thrust to shaft 48.

Similarly, thrust surface 57 of flange 44 is operative to engage washer 46 and enable washer 46 to react and transmit axial thrust to shaft 48 by engaging an opposite edge of groove 58.

A second thrust washer 52 is disposed in an annular groove 56 in the outer surface of mainshaft 48 that is substantially parallel with groove 46 and axially spaced therefrom to position thrust washer 52 adjacent thrust surface 51 of flange 42 of gear 30.

A third thrust washer 50 is disposed in an annular groove 60 in the outer surface of mainshaft 48 that is substantially parallel to groove 46 and is axially spaced therefrom to position washer 50 adjacent thrust surface 59 on flange 44 of gear 32.

Thrust washers 46, 50 and 52 respectively encircle mainshaft 48 and are axially spaced-apart from each other a distance predetermined to enable gears 30 and 32 to rotate relative shaft 48 when neither is clutched thereto and to enable the one being clutched to shaft 48 to engage and transfer axial thrust to thrust washer 46 which in turn will react with an edge of groove 58 to enable the axial thrust to be transferred to shaft 48 rather than to the mainshaft gear in close axial proximity thereto.

It is highly preferable that thrust washers 46, 50 and 52 rotate in unison with mainshaft 48 so that they do not rotate relative the mainshaft gear clutched to the mainshaft.

Although other means may be used to secure thrust washers 46, 50 and 52 to shaft 48, they are preferably secured thereto by their respectively including internal teeth or splines that are substantially uniformly spaced circumferentially about their respective central openings such as alternate grooves 64 and alternate teeth 69 shown in FIG. 2B.

Grooves 64 and teeth 69 of washer 46, 50 and 52 are adapted to mate with teeth 67 and grooves 66 of the external splines about shaft 48 so that internal grooves 64 of washers 46, 50 and 52 can slide axially along exterior splined teeth 67 of shaft 48 to enable the washer to be moved axially therealong until positioned in their respective retaining grooves 58, 60 and 56 and then respectively rotated about the grooves until internal grooves 64 of washers 46, 50 and 52 are in substantial alignment with external spline grooves 66 in shaft 48, at which point, a key 62 is inserted axially therethrough to secure the thrust washers to shaft 48.

Thrust washers 46, 50 and 52 are made from any material having the compatibility, corrosion resistance, strength, durability, and wear resistance characteristics desired and provide a simple and economical means of transferring to a mainshaft axial thrust of mainshaft gear being clutched thereto in response to a shift command.

Although they may differ from each other in structural features provided they operate in the manner herein described, thrust washers 46, 50 and 52 are preferably substantially identical to each other as well as being characteristically disposed in a substantially symmetrical spatial arrangement along the central rotational axis of the mainshaft.

What is claimed is:

1. In a transmission of the type having a mainshaft, at least two floating mainshaft gears encircling said mainshaft in axial spaced-apart relationship to each other, a plurality of countershafts having countershaft gears supporting and mainshaft gears and driving said mainshaft gears at different rotative speeds, thrust means disposed between the mainshaft gears and operative to transmit axial thrust therefrom to the mainshaft, and clutch means selectively operative to clutch said mainshaft gears to said mainshaft one at a time, wherein the improvement is characterized by said thrust means provided by:

each of said mainshaft gears having a flange extending toward the mainshaft and having thrust surfaces of opposite sides thereof facing in a direction along the mainshaft;

a first thrust washer encircling the mainshaft intermediate the respective mainshaft gear flanges;

a second thrust washer encircling the mainshaft adjacent the flange thrust surface of one of said mainshaft gears facing away from the other of said mainshaft gears;

a third thrust washer encircling the mainshaft adjacent the flange thrust surface of the other of said mainshaft gears facing away from said one mainshaft gear;

means for securing said first, second and third thrust washers to the mainshaft for concurrent rotation therewith and to enable axial thrust to be transmitted from the first thrust washer to the mainshaft; and said first, second and third thrust washers axially spaced from each other a distance predetermined to enable the respective mainshaft gears to rotate relative thereto when neither is clutched to the mainshaft and to enable one of said mainshaft gears to rotate relative to said first, second and third thrust washers when the other said mainshaft gear is clutched to the mainshaft; and to enable the flange thrust surface facing towards said first thrust washer of the particular mainshaft gear being clutched to the mainshaft to engage therewith and transmit axial thrust to the mainshaft through the means securing the first thrust washer thereto.

2. The improvement of claim 1 where the mainshaft and clutch means respectively include a plurality of circumferentially spaced mating splines adapted to enable the clutch means to move in opposite axial directions along the mainshaft and the means for securing the first, second, and third thrust washers is provided by said first, second and third thrust washers including splines surrounding the respective openings therethrough that are adapted to matingly engage the mainshaft splines and enable the thrust washers to move in opposite axial directions therealong, the mainshaft includes three grooves that respectively extend circumferentially about the outer surface thereof and are adapted to respectively receive one of said first, second and third thrust washers therein and provide the predetermined axial distance therebetween, the mainshaft spline grooves are aligned with the thrust washers spline grooves, and at least one keyway extends axially along said aligned grooves between said first, second and third thrust washers and operates to secure the mainshaft thereto.

3. Improved gear retaining means for transmitting axial thrust to a transmission mainshaft from a mainshaft gear being clutched thereto, said transmission of the type having at least two of the mainshaft gears encircling the mainshaft in axial spaced-apart relationship to each other, a plurality of countershafts having counter shaft gears supporting said mainshaft gears and driving said mainshaft gears at different rotative speeds, thrust means disposed between the mainshaft gear and operative to transmit axial thrust therefrom to the mainshaft, and clutch means selectively operative to clutch said mainshaft gears to the mainshaft one at a time, wherein the improvement is characterized by said thrust means provided by:

each of said mainshaft gears having a flange extending toward the mainshaft and having thrust surfaces on opposite sides thereof facing in a direction along the mainshaft;

a first thrust washer encircling the mainshaft intermediate the respective mainshaft gear flanges;

a second thrust washer encircling the mainshaft adjacent the flange thrust surface of one of said mainshaft gears facing away from the other of said mainshaft gears;

a third thrust washer encircling the mainshaft adjacent the flange thrust surface of the other of said mainshaft gears facing away from said one mainshaft gear;

means for securing said first, second and third thrust washers to the mainshaft for concurrent rotation therewith and to enable axial thrust to be transmitted from the first thrust washers to the mainshaft; and said first, second and third thrust washers axially spaced from each other a distance predetermined to enable the respective mainshaft gears to rotate relative thereto when neither is clutched to the mainshaft and to enable one of said mainshaft gears to rotate relative said first, second and third thrust washers when the other said mainshaft gear is clutched to the mainshaft and to enable the flange thrust surface facing towards said first thrust washer of the particular mainshaft gear being clutched to the mainshaft to engage therewith and transmit axial thrust through the means secured the first thrust washer thereto.

4. The gear retaining means of claim 3 wherein the mainshaft and clutch means each include a plurality of circumferentially spaced mating splines adapted to enable the clutch means to move in opposite axial directions along the mainshaft and the first, second and third thrust washers each include splines surrounding the openings therethrough that are adapted to matingly engage the mainshaft splines and enable the thrust washers to move in opposite axial directions therealong, the mainshaft includes three grooves that extend circumferentially about the outer surface thereof and are adapted to receive one of said first, second and third thrust washers therein and provide the predetermined axial distance therebetween, the axial extending mainshaft spline grooves are aligned with the thrust washers spline grooves, and at least one key extends axially along said aligned grooves between said first, second and third thrust washers and operates to secure the mainshaft thereto.

5. The transmission of claim 1 wherein the first, second and third thrust washers have identical configurations.

6. The gear retaining means of claim 2 wherein the first, second, and third thrust washers have identical configurations.

7. The transmission of claim 1 or 5 wherein the first, second and third thrust washers are disposed in a substantially symmetrical spatial arrangement along the of the mainshaft.

* * * * *